Sept. 27, 1949.          J. T. PARSONS ET AL          2,483,230
                PROCESS OF AND APPARATUS FOR SECURING
Filed May 3, 1946       PARTS TO ROTOR BLADE SPARS
                                                  2 Sheets-Sheet 2
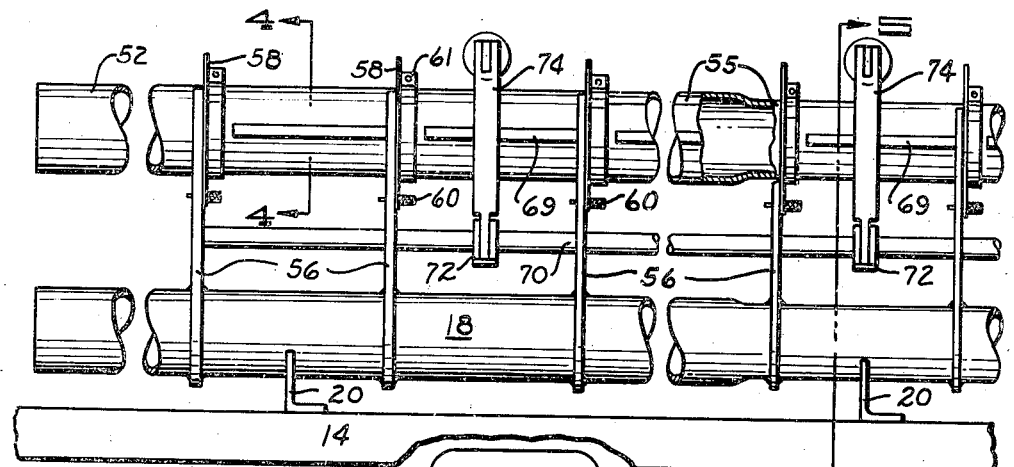
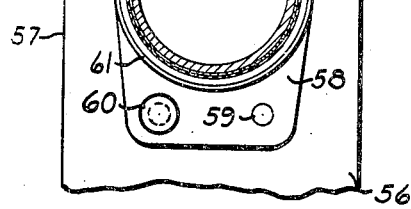
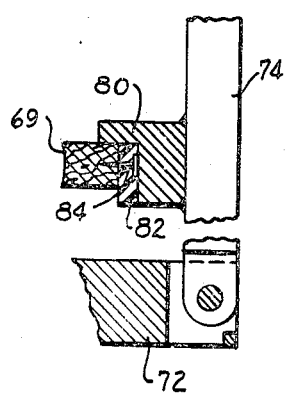
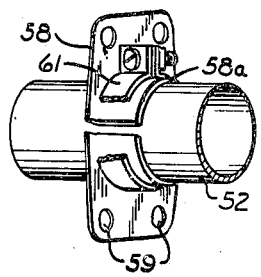
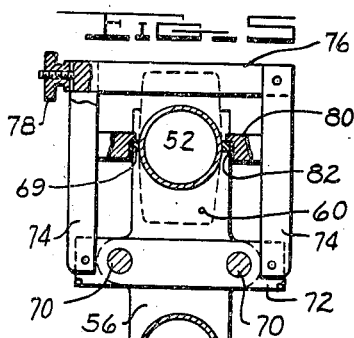
Inventor
JOHN T. PARSONS
ERIK R. BROGREN.
Parker & Burton
Attorneys Patented Sept. 27, 1949

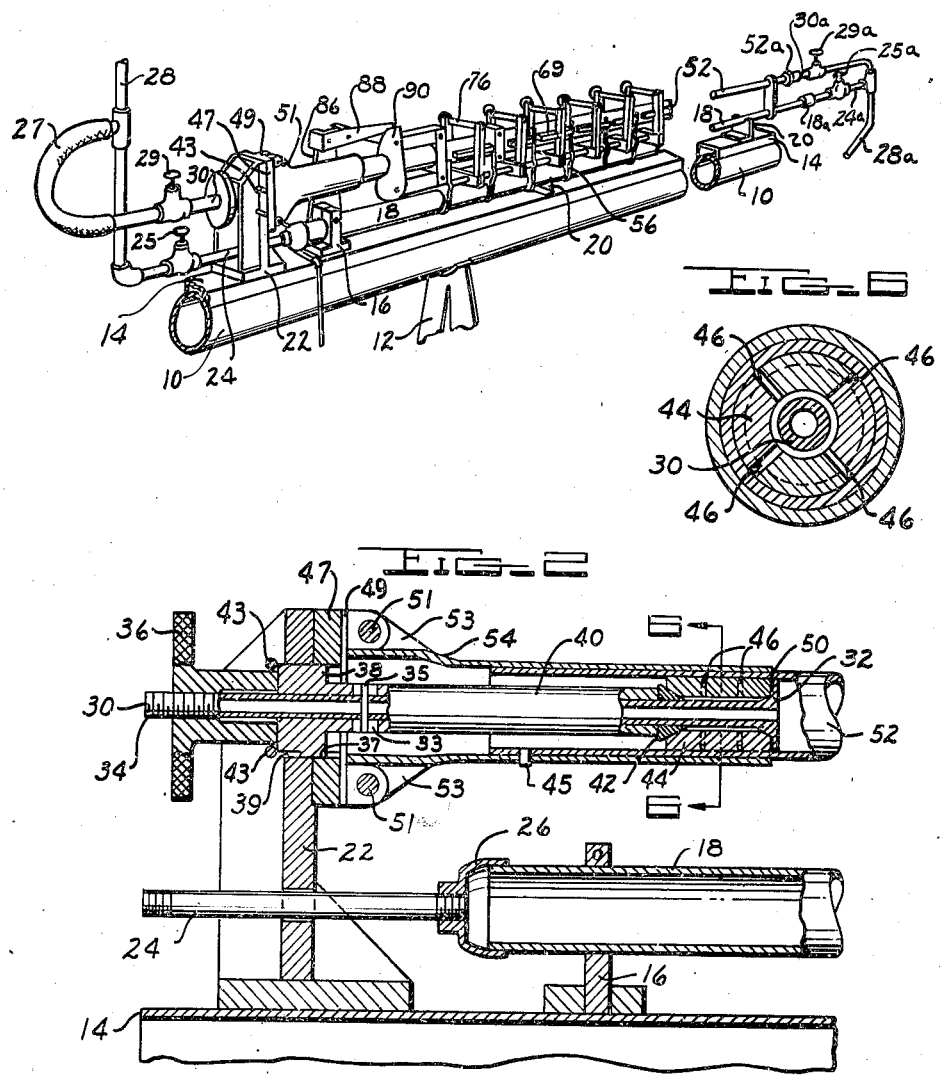

2,483,230

UNITED STATES PATENT OFFICE 2,483,230

PROCESS OF AND APPARATUS FOR SECURING PARTS TO ROTOR BLADE SPARS

John T. Parsons and Erik R. Brogren, Traverse City, Mich., assignors, by mesne assignments, to Parsons Corporation, Detroit, Mich., a corporation of Michigan Application May 3, 1946, Serial No. 667,210

14 Claims. (Cl. 154—1.6)

This invention relates to an improved process of and apparatus for securing parts to and along the length of a tubular element by thermal adhesion and particularly to such a process and apparatus for securing blade supporting parts to a rotor blade tubular spar.

The particular process of thermal adhesion employed is that commonly known in the trade as "cycle-welding." It is a process wherein the adhesive securement of the parts together is obtained by heating the adhesive in situ.

The tubular rotor blade spar to which the parts are secured by cyclewelding as here illustrated is a tapered tubular metal spar of the character used in a helicopter rotor blade.

The process and apparatus illustrated is one particularly designed to secure blade rib supporting hubs or flanges by cyclewelding to the spar at predetermined positions throughout its length and to obtain such securement without resulting dislocation of the parts due to the expansion of the tubular spar during the application of heat thereto in the carrying out of the cyclewelding process. The fixture shown is one particularly designed to carry out this process.

The spar illustrated is of substantial length and this invention is adapted for securement of parts to a tube of substantial length. The rotor blade spar shown in one form has a length of 22 feet, a diameter at the hub of 2¾ inches and a diameter at the tip of 13/16 of an inch. The spar shown is adapted to be provided with a large number of ribs arranged in a linear plane and adapted to be secured to the spar by hub parts. It is not only necessary that these hub parts be securely mounted upon the spar but it is also necessary that they be accurately positioned along the length of the spar. These hub parts are secured to the spar along its length at intervals which may vary from between two and three inches to eight inches. As the spar is heated throughout its length to secure these hub parts thereto by thermal adhesion a spar of the length above stated may expand ⅜ of an inch or more in length.

An object of this invention is to secure parts by thermal adhesion in accurately spaced relationship along a tubular element without the parts becoming dislocated during the securement and to maintain the predetermined longitudinal spacing of the parts along the spar notwithstanding expansion lengthwise of the spar during the cyclewelding.

Another object is to provide a process and fixture whereby a tubular spar provided with rib hub parts which are to be secured thereto is supported for the delivery of steam into one end of the spar to heat the adhesive to accomplish the cyclewelding of the parts to the spar and wherein the arrangement is such that means are provided to so position the hub parts during the cyclewelding process that while the parts are accurately relatively positioned along the spar they will permit expansion of the spar linearly under the influence of heat without disturbing the joint formed between the hub part and the spar or without disturbing the relative location of the hub parts upon the spar.

A meritorious feature is that the hub parts or flanges are so supported with respect to the tubular spar to which they are to be secured by thermal adhesion that as the spar to which adhesion is made changes its lengthwise dimension during securement of the parts thereto, the parts correspondingly change their linear positions while maintaining their relative positions. During heating the spar expands lengthwise. During cooling the spar contracts lengthwise. The hub parts are so supported that they correspondingly change their actual positions while maintaining their relative positions.

More particularly an object is to provide a fixture which includes means for supporting a tubular rotor blade spar having hub parts mounted thereon and means for delivering steam to the interior of such spar and means including a similarly positioned similar tubular frame spar to which steam is also delivered which frame spar is provided with supports that position the hub parts along the rotor blade spar. Due to the delivery of steam both to the rotor blade spar and to the frame spar and due to the similar positioning of these similar spars their expansion and contraction linearly is equal and the hub supports carried by the frame spar which determine the position of the hub parts along the rotor blade spar therefore maintain their predetermined relative positions during the carrying out of the cycle-welding process.

The fixture comprises a frame which includes a tubular frame spar which is similar to the tubular rotor blade spar to which the hub parts are to be secured. This tubular frame spar is secured at one end to the frame. Means is provided for delivering steam into such end of the frame spar. Throughout the remainder of its length it is slidably supported for linear expansion or contraction under the influence of heat. This tubular frame spar is provided with a row of linearly spaced hub part positioning and spar supporting saddles. The rotor blade spar to which the hub parts are to be secured is disposed to extend along over these saddles and the hub parts which are to be secured to the rotor blade spar are positioned by the saddles. Means is provided to deliver steam to the interior of the rotor blade spar at the same time that steam is delivered to the frame spar so that the expansion and contraction lengthwise of the two spars will correspond.

Other objects, advantages and meritorious features of this invention will more fully appear from the following description, appended claims and accompanying drawings, wherein:

Figure 1 is a perspective of a fragment of the improved fixture showing a spar therein.

Figure 2 is a vertical sectional view, partly broken away, through one end of the fixture and spar.

Figure 3 is a side elevation, partly broken away, of a portion of the figure and spar.

Figure 4 is a vertical sectional view taken on the line 4—4 of Figure 3.

Figure 5 is a vertical sectional view taken on the line 5—5 of Figure 3.

Figure 6 is a vertical sectional view taken on the line 6—6 of Figure 2.

Figure 7 is a perspective of a fragment of a spar 52 showing a split hub part 58 clamped thereabout.

Figure 8 is a fragmentary section through one of the intercostal clamps enlarged as compared with Figure 5.

As hereinabove stated the purpose of this invention is to secure parts to and along a relatively long tube by thermal adhesion and to secure such parts to the tube in predetermined relationship. This is accomplished by assembling the parts upon the tube with heat responsive adhesive interposed between the tube and the parts and then heating the adhesive to cause the same to set and permanently secure the parts to the tube. The adhesive may be heated by heating the tube to which the parts are to be secured. The tube may be heated by introducing hot steam thereinto to flow therethrough.

Inasmuch as the tube will expand during heating and contract during cooling and in order that the parts may be secured to the tube in predetermined spaced relationship the parts are supported during the thermal adhesion upon supporting means which includes a second similar and similarly supported tube which second tube is heated simultaneously with and to the same degree as the first tube. The process and fixture herein described is designed to accomplish the above result.

The fixture includes a tubular base member 10 supported upon a plurality of fixed upright standards 12, one of which standards is shown in Figure 1. A plate 14 is secured to and extends lengthwise along the tubular base member. A tubular member 18 extends along over the plate 14 and has one end clamped within the upright standard 16 which standard 16 is fixed to the plate 14. Extending away from this fixed end this tubular member 18 is slidably supported at intervals upon a plurality of stationary saddle supports 20 fixed to the plate 14. The tube 18 is free upon the saddle supports 20 so that as the tube is heated it may expand or contract lengthwise slidably over said saddle supports.

The plate 14 carries at one end, in proximity to the standard 16, an upright channel shaped standard 22. A steam pipe 24 extends through this standard 22 as shown in Figures 1 and 2. This steam pipe communicates through a coupling 26 with the interior of the tubular member 18 to introduce steam thereinto. This steam pipe is provided with a control valve 25. It receives its supply of steam from a steam main 28. This main 28 also supplies steam to a steam pipe 30 for discharge therefrom into a tubular spar 52 to which parts are adapted to be secured. The steam pipe 30 is provided with a control valve 29 and it communicates with the main 28 through a flexible conduit 27. This main 28 leads from a suitable source of steam not shown.

At the opposite end of the fixture a steam pipe 24—A, provided with a control valve 25—A is connected with the small end of frame spar 18 by a suitable coupling 18—A to lead steam therefrom to an outlet pipe 28—A which returns the steam to the system. This return line 28—A is a flexible tube such as copper. A steam pipe 30—A, having a control valve 29—A is coupled with the small end of the spar 52 by a suitable coupling 52—A and leads into this return line 28—A.

The pipe 30 is adapted to be introduced into the open end of the tubular spar to which the parts are to be secured. For this purpose the pipe 30 is provided with means to form a tight internal joint with such spar. The pipe 30 is provided at its inner end with a conical end portion 32 (Figure 2). The outer end of the pipe is threaded as at 34 and there is rotatably threaded upon such outer end a manually operable wheel 36. Mounted upon the pipe 30 is a tube 40. This tube 40 has a flange 38 upon its outer end which flange is engaged by the hub of the hand wheel 36 as shown in Figure 2. This flange 38 has a spline 37 received within a keyway 39 within the standard 22 to prevent rotation of the tube 40 while permitting its linear adjustment. The tube 30 has a pin 35 extending transversely therethrough. The outer ends of this pin are disposed within linear slots 33 in the tube 40 which prevents relative rotation between the tubes 30 and 40 while permitting limited relative linear movement.

The inner end of this tube 40 abuts a cone 42 which slidably encircles the pipe 30. Between the beveled face of this cone 42 and the beveled face of the end flange 32 are mounted a plurality of separate cylinder segments 44. These segments are held about the tube 30 by springs 46. These springs encircle the segments within grooves formed circumferentially about the segments as shown in Figures 2 and 6. The ends of these cylinder segments 44 are beveled to correspond with the beveled faces of the end flange 32 of tube 30 and the cone 42 as shown.

It will appear therefore that when the wheel 36 is rotated to draw the tube 30 outwardly therethrough it will urge the segments 44 outwardly against the inner wall of the spar 52 to grip the same because the opposite ends of these cylinder segments bear against the cone 42 which cone is being simultaneously urged inwardly by the tube 40.

The gripping engagement of the segments 44 with the spar 52 holds the tube 30 within the spar against the steam pressure built up within tube 52. Reverse rotation of the hand wheel 36 loosens the segments from the spar 52. Safety stop pins 43 are removably provided within the standard 22 engaging the flange 38 on the end of tube 40 to prevent ejection of the same outwardly should the segments 44 accidentally release from the spar 52. A gasket 50 is interposed between the end flange 32 and the ends of the cylinder segments 44 and is not only compressed therebetween when such segments are expanded radially but is also expanded radially to seal the joint formed thereby with the tubular spar 52 to prevent steam leakage.

The spar here shown is illustrated as having a hub mounting 54 illustrated in Figure 2 as secured by pins such as 45 to the spar 52 against relative rotation. The standard 22 has a plate 47 secured thereto. This plate 47 is provided with spaced apart pairs of ears 49 through which pins 51 extend as shown in Figures 1 and 2. The hub 54 is provided with opposed radial flanges 53 which are received between the ears 49. The pins 51 extend through holes in the flanges securing the hub and through the hub the spar 52 to the standard 22.

The spar 52 extends linearly along and above the tubular frame spar 18. The spar 52 is the one to which the parts are to be secured. The spar 52 which is here shown is a rotor blade spar for a helicopter rotor blade. Such spar is shown in Figure 3 as made up of a plurality of sections 55 of different diameter. These different diameter sections are die drawn from a uniform diameter tube so that the several sections 55 together constitute an integral spar tapering by steps from one end to the other.

The fixture is so constructed that the frame tube or spar 18 is a duplicate of the live spar to which the parts are to be secured. The spar 18 carries at intervals along its length a series of supporting elements or saddles 56. These saddles are forked at their upper ends as at 57 so that the live spar 52 can extend therethrough but is free therefrom. These saddles 56 are each provided with a locating pin 60 adapted to position a hub part 58 thereon. Each hub part is mounted upon the live spar 52 and is provided with apertures 59. The locating pin 60 extends through one of these apertures 59 and also extends through an aperture through the saddle 56 as shown in Figure 4 to position the hub part 58. These locating pins 60 hold the hub parts 58 positioned on the saddles during the securement of the hub parts to the live spar 52.

Each hub part of rib supporting flange 58 is here shown as having a split cylindrical collar 58—A or split hub proper mounted upon the spar 52. This collar 58—A is encircled by a clamping band 61 which clamps the split hub portion tightly around the spar as shown particularly in Figure 7.

In addition to the hub parts 58 being secured to the spar 52, wood strips or blocks termed intercostals 69 are also secured at spaced intervals to the spar 52. The fixture is provided with suitable clamping mechanism to hold these intercostals to the spar during their adhesive securement thereto. Such clamping mechanism is carried by supporting rods 70 which rods are carried by the saddles 56 and extend lengthwise of the frame spar 18. Two such rods 70 are shown. These rods extend through provided apertures in the saddles 56. These rods may be secured to one of the saddle elements but have permitted slidable adjustment through the remaining saddles.

A plurality of clamping devices are supported upon these rods. Each clamping device includes a bottom cross piece 72 mounted slidably upon the rods 70. A side section 74 is pivoted to each end of the cross piece 72. These two side sections are adapted to be swung upright to the position shown in Figure 5. A top cross piece 76 is pivoted to one upright section 74 and is adapted to be swung down and received within the forked upper end of the other upright section 74. The free end of the top cross piece 76 is threaded and a hand nut 78 is threaded thereupon as shown in Figure 5. The hub of this hand nut may be tightened against the adjacent upright section 74 to draw the two upright sections down upon the intercostals 69 holding them snugly against the spar.

Each upright section 74 of the clamping mechanism is provided with a rabbeted block 80, shown in Figures 5 and 8, which block may be provided with a compressible facing 82 formed of rubber or the like. A pointed retainer pin 84 may be mounted in the block 80 to project through the compressible facing 82 to engage an intercostal member 69 to hold it in position upon the block 80 and against the spar 52 as shown in Figure 8.

Figure 1 shows the fixture provided with a standard 86 upon which is pivoted an offset lever 88 which is adapted to swing down as shown in Figure 1 to engage within a slot formed in a part 90 mounted upon the spar 52 to rotatably position such spar. This lever may be swung up to release the spar.

In carrying out the instant process the spar 52 to which the hub parts 58 are to be secured and the hub parts 58 themselves are first treated with a suitable thermal adhesive. In the particular cyclewelding process which has been commercially employed this adhesive coating is commercially known by the trade designation C–3. It is a heat responsive plastic adhesive. This plastic coating may be painted upon the entire outer surface of the spar and over the inner surfaces of the collars or the hub parts 58—A. Such coated surfaces may then be allowed to air dry for 24 hours or may be subjected to heat treatment for ten minutes at 280° F.

Following this preliminary preparation the hub parts 58 are then placed upon the spar 52 and the inner surfaces of the collars 58—A of the hub parts are coated with the second coating employed in the cyclewelding process. This second coating has the trade name designation C–B–4. Those portions of the spar 52 which are to be embraced by the collars of the hub parts 58 are also coated with this second coating. In exaggerated thickness these coatings are shown in Figure 4 as a layer 92. The spar 52 with the hub parts supported thereon is then positioned within the fixture as hereinabove set forth. The steam lines 30 and 30—A are connected with opposite ends of the spar as hereinabove described. This particular invention concerns itself with the fixture and with the process involved in this second step of the cyclewelding method.

Steam is then introduced from a suitable source of steam supply into the main 28 which supplies steam to the steam pipes 24 and 30 which pipes deliver steam into the tubular frame spar 18 and the tubular live spar 52. Steam is delivered into these spars so as to heat the spars simultaneously and equally so that they will expand simultaneously and equally. The spar 52 is heated to that temperature which is required to permanently set the adhesive which depends upon the particular heat responsive adhesive used. Such temperature with the cyclewelding coating C–B–4 is in the neighborhood of 350° F. and is continued for twenty minutes or thereabouts. The steam flows through both spars being discharged therefrom through steam return lines 24—A and 30—A into outlet 28—A.

During the heating of the spar 52 it tends to expand lengthwise. The frame spar which receives steam at the same temperature, as it is from the same source, and which is a spar similar to spar 52 to which the parts are being secured tends to similarly expand lengthwise. The saddles 56 which carry the hub parts travel with the frame spar and continue to maintain these hub parts at the proper location and at the same relative points along the spar 52.

What we claim is:

1. A fixture for securing parts upon and along the length of a tubular spar comprising, in combination, a frame base provided with a line of spar supports, a tubular frame member supported at one end upon the base and seated at intervals along its length upon said spar supports for slidable extension thereover, said tubular frame member provided at intervals along its length with a row of upright supports for spar parts to be secured to a tubular spar extending along said row.

2. A fixture for securing parts upon and along the length of a tubular element, comprising, in combination, a frame including a base provided with a line of upright supports for a tubular element, a tubular frame element secured at one end to the base and slidably seated along its length upon said supports, said frame element provided at intervals along its length with a row of upright saddle supports for parts to be secured to a tubular spar extending along said row and a source of steam having one line leading into the tubular frame element and a second line adapted to lead into a tubular element extending along said supports.

3. A fixture for securing parts upon a tube, comprising, in combination, a frame including a tubular member supported at intervals throughout its length for permitted linear expansion, said tubular member provided with a row of linearly spaced upright part supporting devices and a steam line leading into said tubular member.

4. A fixture for securing spar parts upon a tubular spar comprising, in combination, a frame including a tubular spar fixed at one end and supported at intervals throughout its length toward its opposite end for linear expansion, said frame spar provided with a row of linearly spaced apart upright spar supporting saddles, a standard to which one end of a tubular spar is adapted to be secured, said standard fixed on the frame at one end of and in line with said row of saddles so that a spar secured to said standard will extend over the saddles.

5. A fixture for positioning parts upon and along a tubular spar comprising a frame including a tubular spar fixed at one end and supported at intervals throughout its length spaced away from said end for linear expansion, said frame spar provided with a row of linearly spaced apart spar part supporting and positioning members and means for heating the tubular spar.

6. A fixture for assembling spar parts upon a tubular spar comprising a frame including a tubular spar fixed at one end and supported at intervals throughout its length spaced away from said end for linear expansion, said frame spar provided with a row of upright linearly spaced apart spar part supporting and positioning members and means for introducing steam into said frame spar.

7. A fixture for assembling spar parts upon a tubular spar comprising a frame including a tubular spar fixed at one end and supported at intervals throughout its length toward its opposite end for linear expansion, said frame spar provided with a row of linearly spaced apart upright spar part supporting and positioning members, a fixed standard disposed at one end of the row of members and adapted to support one end of a tubular spar extending over said members and a steam line adapted to deliver steam to said frame spar and to the spar extending over said members.

8. A fixture for assembling spar parts upon a tubular spar comprising a frame provided with a tubular spar supported at intervals throughout its length for linear expansion, said frame spar provided with a row of linearly spaced apart upright spar supporting members, spar part positioning means carried by said members, a standard fixed at one end of the row of members adapted to support one end of a tubular spar extending over said members.

9. A fixture for assembling spar parts upon a tubular spar comprising a frame provided with a tubular spar supported at intervals throughout its length for linear expansion, said frame spar provided with a row of linearly spaced apart upright spar supporting members, spar part positioning means carried by said members, steam delivery means at one end of the row of members adapted to deliver steam to a spar extending over said members and adapted to deliver steam to the frame spar which carries the members.

10. A fixture for assembling rotor blade parts upon a tubular rotor blade spar comprising a frame provided with a tubular spar supported at intervals throughout its length for linear expansion, said frame spar provided with a row of linearly spaced apart upright rotor blade spar supporting members, blade part positioning means carried by said members, clamping means mounted upon said frame spar between said members operable to hold parts against the tubular spar which extends over the members and means for introducing steam into said frame spar and the rotor blade spar mounted upon said supporting members.

11. That process of securing a plurality of rotor blade parts at determined positions to and along a tubular rotor blade spar by thermal adhesion comprising supporting the spar, while provided with blade parts mounted thereon and carrying interposed thermal adhesive, for linear expansion under heat; providing a corresponding and parallel frame spar similarly positioned and similarly supported for linear expansion under heat, said frame spar provided with blade part supports spaced linearly therealong; positioning the blade parts along the rotor blade spar by mounting them upon the blade part supports on the frame spar to shift therewith upon linear expansion of the frame spar and heating the rotor blade spar and frame spar simultaneously and substantially equally for substantially simultaneous and equal expansion and sufficiently to set the adhesive securing the blade parts to the rotor blade spar.

12. That process of securing a plurality of blade parts at determined positions to and along a tubular rotor blade spar by thermal adhesion comprising supporting the spar, while provided with blade parts mounted thereon and carrying thermal adhesive between the spar and the parts, for linear expansion under heat; providing a similar frame spar similarly positioned and supported in adjacent parallelism for corresponding linear expansion under heat, said frame spar having blade part supports fixed thereto and spaced linearly therealong; positioning blade parts along the rotor blade spar by securing them to the blade part supports on the frame spar to shift therewith upon linear expansion of the frame spar, delivering steam to the interior of the rotor blade spar and the interior of the frame spar to simultaneously and equally heat said spars for substantially simultaneous and equal expansion and sufficiently to set the adhesive securing the blade parts to the rotor blade spar.

13. That process of securing by thermal adhesion a plurality of parts to and along a tubular element comprising supporting the tubular element for linear expansion under heat, holding said parts spaced along said tubular element by positioning them along a second tubular element supported for linear expansion under heat, and heating said two tubular elements simultaneously.

14. That process of securing by thermal adhesion a plurality of parts to a long tube comprising supporting the tube for permitted linear expansion under heat, positioning said parts spaced along the tube by supporting the parts upon a second tube similar to the first tube and extending parallel thereto and also supported for linear expansion under heat, and introducing steam into one end of each tube to heat both tubes equally and simultaneously.

JOHN T. PARSONS.
ERIK R. BROGREN.

REFERENCES CITED

The following references are of record in the file of this patent:

UNITED STATES PATENTS

| Number | Name | Date |
|---|---|---|
| 1,297,643 | Boyer | Mar. 18, 1919 |
| 2,284,563 | Dillman et al. | May 26, 1942 |